(12) United States Patent
Seil et al.

(10) Patent No.: US 7,413,155 B2
(45) Date of Patent: Aug. 19, 2008

(54) METHOD OF MANUFACTURING AND USING AN APPARATUS CAPABLE OF HOLDING AN OBJECT

(75) Inventors: Oliver Duncan Seil, Pasadena, CA (US); Ernesto Quinteros, Los Angeles, CA (US); Vijendra Nalwad, Newbury Park, CA (US)

(73) Assignee: Belkin International, Inc., Compton, CA (US)

( * ) Notice: Subject to any disclaimer, the term of this patent is extended or adjusted under 35 U.S.C. 154(b) by 0 days.

(21) Appl. No.: 11/588,169

(22) Filed: Oct. 25, 2006

(65) Prior Publication Data

US 2007/0102612 A1    May 10, 2007

Related U.S. Application Data

(62) Division of application No. 10/833,637, filed on Apr. 27, 2004, now Pat. No. 7,140,586.

(51) Int. Cl.
*A47K 1/08* (2006.01)
(52) U.S. Cl. .................. 248/311.2; 248/309.1
(58) Field of Classification Search ......... 248/311.2, 248/309.1, 519, 521, 310, 520, 523, 534; 224/542, 544, 545, 556; 379/454; 455/90.3
See application file for complete search history.

(56) References Cited

U.S. PATENT DOCUMENTS

| | | | |
|---|---|---|---|
| 4,066,231 A * | 1/1978 | Bahner et al. | 248/552 |
| 5,088,673 A | 2/1992 | Chandler | |
| 5,174,534 A | 12/1992 | Mitchell | |
| 5,489,055 A | 2/1996 | Levy | |
| 5,499,427 A | 3/1996 | Bowman | |
| 5,568,549 A | 10/1996 | Wang | |
| 5,669,538 A | 9/1997 | Ward | |
| 5,745,565 A | 4/1998 | Wakefield | |
| D402,666 S | 12/1998 | Golder | |
| 5,897,041 A | 4/1999 | Ney et al. | |
| 5,961,016 A | 10/1999 | Hartmann et al. | |
| 5,996,950 A | 12/1999 | Richter | |
| 6,062,518 A | 5/2000 | Etue | |
| 6,176,401 B1 | 1/2001 | Lim | |
| 6,246,766 B1 | 6/2001 | Walsh | |
| 6,267,340 B1 | 7/2001 | Wang | |
| 6,366,672 B1 | 4/2002 | Tsay | |
| 6,684,565 B2 * | 2/2004 | Kemp et al. | 47/83 |
| 7,140,586 B2 * | 11/2006 | Seil et al. | 248/311.2 |
| 7,246,781 B2 | 7/2007 | Nam | |
| 2002/0114660 A1 * | 8/2002 | Burton | 403/122 |
| 2005/0211714 A1 * | 9/2005 | Kazyaka | 220/737 |

* cited by examiner

*Primary Examiner*—Amy J. Sterling
(74) *Attorney, Agent, or Firm*—Bryan Cave LLP

(57) ABSTRACT

An apparatus capable of holding an object in cooperation with a cup holder of a vehicle comprises a support (110), a post (120) coupled to the support, and a base (130). The post has a first end (221) and a second end (222), and the base is capable of receiving the first end of the post. The base is sized to fit within the cup holder of the vehicle. A distance between the support and the base may be adjusted, and an angle between the support and the post may also be adjusted.

24 Claims, 4 Drawing Sheets

METHOD OF MANUFACTURING AND USING AN APPARATUS CAPABLE OF HOLDING AN OBJECT

CROSS REFERENCE TO RELATED APPLICATIONS

This application is a divisional application of U.S. Pat. No. 7,140,586, filed Apr. 27, 2004.

FIELD OF THE INVENTION

This invention relates generally to object-holding apparatus, and relates more particularly to object-holding apparatus capable of use in a vehicle.

BACKGROUND OF THE INVENTION

Many users of today's portable electronic devices expect to be able to use such devices while traveling in a vehicle. Therefore, it is desirable that such devices be maintained in a position that provides stability, security, and easy access to and visibility of any buttons, menus, screens, or other features of the device that are necessary for its use. There are many places a person in a vehicle could place such a device, including in a pocket of the user's clothing, on a seat, on the floor, on the dashboard, in the glove box, etc., but none of these places offer the stability, security, and easy access and visibility desired. Accordingly, there exists a need for an apparatus capable of holding and maintaining a portable electronic device, or other device, in a position where the advantages listed above may be realized.

BRIEF DESCRIPTION OF THE DRAWINGS

The invention will be better understood from a reading of the following detailed description, taken in conjunction with the accompanying figures in the drawings in which.

Figure 1:
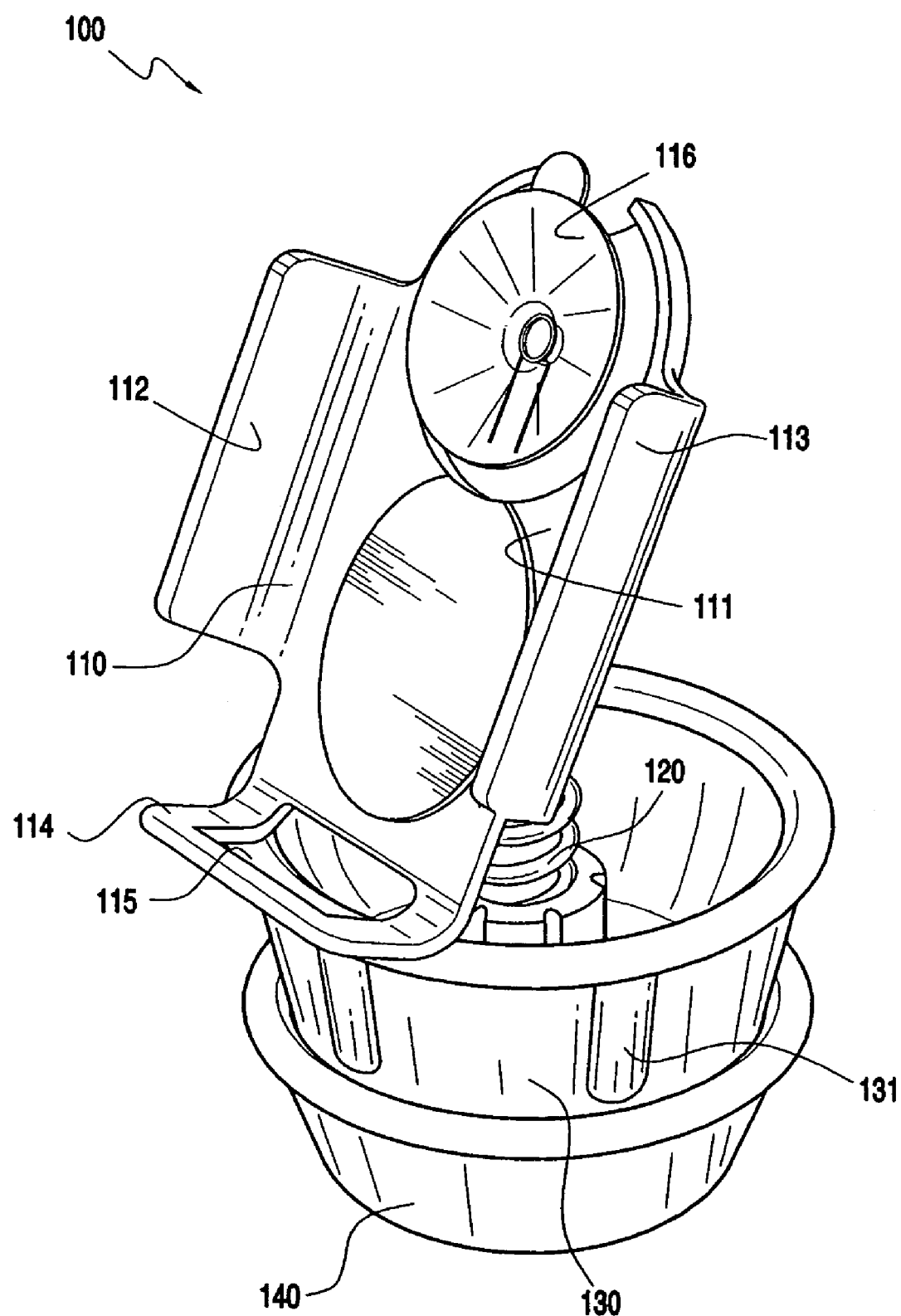
FIG. 1 is a perspective view of an apparatus capable of holding an object and capable of use in cooperation with a cup holder of a vehicle according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, an apparatus capable of holding an object in cooperation with a cup holder of a vehicle comprises: a support; a post coupled to the support; and a base. The post has a first end and a second end, and the base is capable of receiving the first end of the post. The base is sized to fit within the cup holder of the vehicle, and a distance between the support and the base may be adjusted.

FIG. 1 is a perspective view of an apparatus 100 according to an embodiment of the invention. Apparatus 100 is capable of holding an object and further capable of use in cooperation with a cup holder of a vehicle. As illustrated in FIG. 1, apparatus 100 comprises a support 110, a post 120 coupled to support 110, and a base 130. Support 110 serves as a platform, a cradle, or other resting place or supporting surface for an object to be held by apparatus 100 for the convenience of an occupant, and particularly the driver, of a vehicle. As an example, the object could be a cellular telephone (cell phone), a personal digital assistant (PDA), an MP3 player, a tablet personal computer (tablet PC), or similar electronic device, or it could be a non-electronic object such as a notepad, a clipboard, or the like.

Nearly all vehicles have at least one cup holder located near the driver's seat. Base 130 is complementary in shape and sized to fit within, or is conformal to, the cup holder such that the object held by apparatus 100 is securely and conveniently positioned within easy reach of the vehicle's driver. Using apparatus 100 to hold an object as described reduces the likelihood that the object will slide around in a moving vehicle, get broken or lost, or be operated in an unsafe manner due to its being poorly positioned or in an inconvenient location. To accommodate cup holders of different sizes, apparatus 100 can further comprise an adapter cup 140 sized to receive base 130 and that can be placed under base 130 to increase the perimeter of base 130 that engages the sides of the cup holder. Adapter cup 140 can thus allow apparatus 100 to function with cup holders having larger circumferences than would be usable by apparatus 100 using base 130 alone. In the embodiment illustrated in FIG. 1, base 130 comprises at least one ridge 131. In addition to providing an increase in circumference for base 130, ridge 131 provides friction between base 130 and the cup holder of the vehicle, and both the size increase and the friction tend to stabilize apparatus 100 in the cup holder and further allow apparatus 100 to function with cup holders having larger circumferences than would otherwise be possible.

As an example, base 130 can comprise a plastic material, a thermoplastic elastomer, another flexible or non-flexible molded material, or the like. Further size accommodation, in addition to that mentioned above for larger cup holders, can be achieved by forming base 130 from a flexible material that can be squeezed or wedged into smaller cup holders. A flexible material, such as a thermoplastic elastomer, allows base 130 to wedge into smaller cup holders than a rigid plastic base would allow. Friction between apparatus 100 and the cup holder, desirable because it helps maintain stability, is also better if a flexible material is used. In addition, a thermoplastic elastomer or similar material, because of surface friction, is well suited to grip post 120, thus helping post 120 to stay in place where positioned by a user of apparatus 100.

In the illustrated embodiment, support 110 comprises a surface 111, a sidewall 112 coupled to surface 111, a sidewall 113 coupled to surface 111 opposite sidewall 112, and a lip 114 coupled to surface 111. Surface 111 acts as a major support surface for the object being held by apparatus 100, while sidewalls 112 and 113 act to stabilize the object and prevent it from sliding off surface 111 to either side. Lip 114, which in the illustrated embodiment curls slightly upward to embrace the object, stabilizes the object by preventing it from sliding off surface 111 in the direction of lip 114. Lip 114 defines an opening 115, which opening 115 extends partially into surface 111. As an example, opening 115 can admit the passage of cables, wires, or other electrical connectors used with the object being held by apparatus 100. In a non-illustrated embodiment, one or more of sidewall 112, sidewall 113, lip 114, and opening 115 can be omitted from apparatus 100. Support 110 and post 120 can be made of acrylonitrile butadiene styrene (ABS), a polycarbonate material, another rigid injection molded material, or the like. Alternatively, a flexible injection molded material, such as polyurethane, rubber, or a thermoplastic elastomer, or the like, could be used.

Support 110 can further comprise, or can be attached or coupled to, a suction cup 116. As an example, suction cup 116 can be capable of securing the object being held by apparatus 100 within support 110 by adhering to the object being held by apparatus 100 in the well known manner typical for suction cups.

Figure 2:
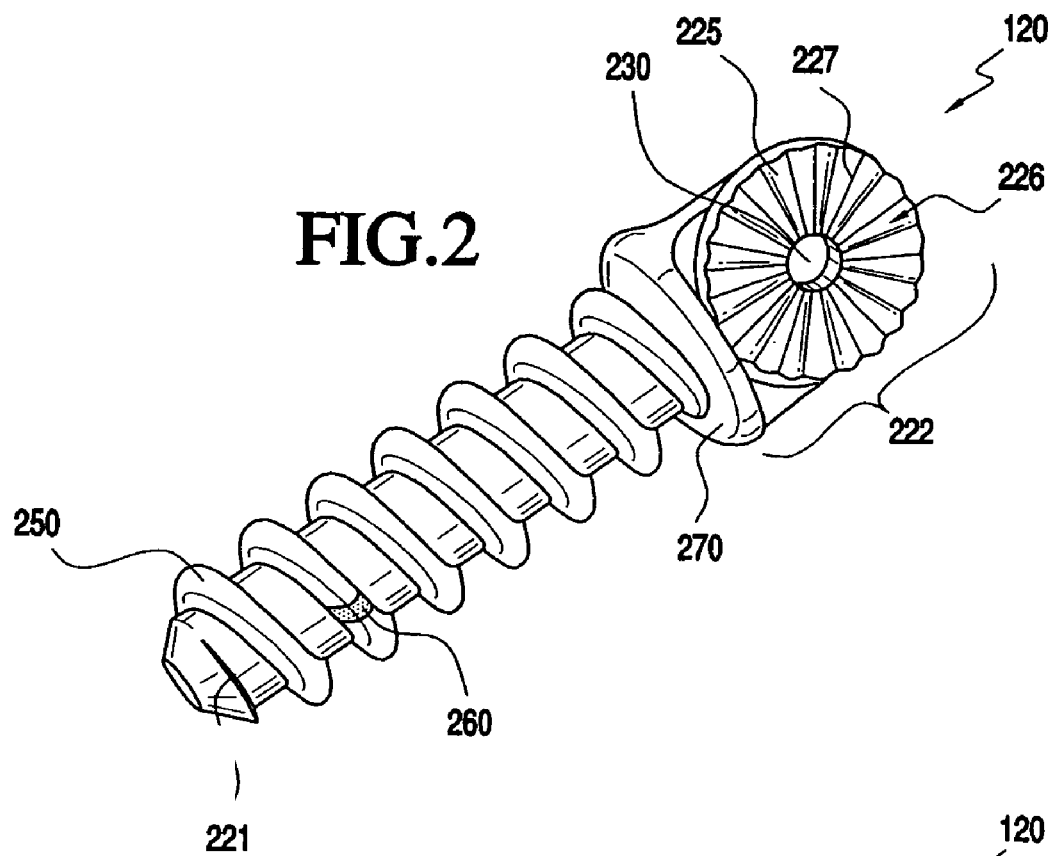
FIG. 2 is a perspective view of a first side of a portion of the apparatus of FIG. 1 according to an embodiment of the invention.
Figure 3:
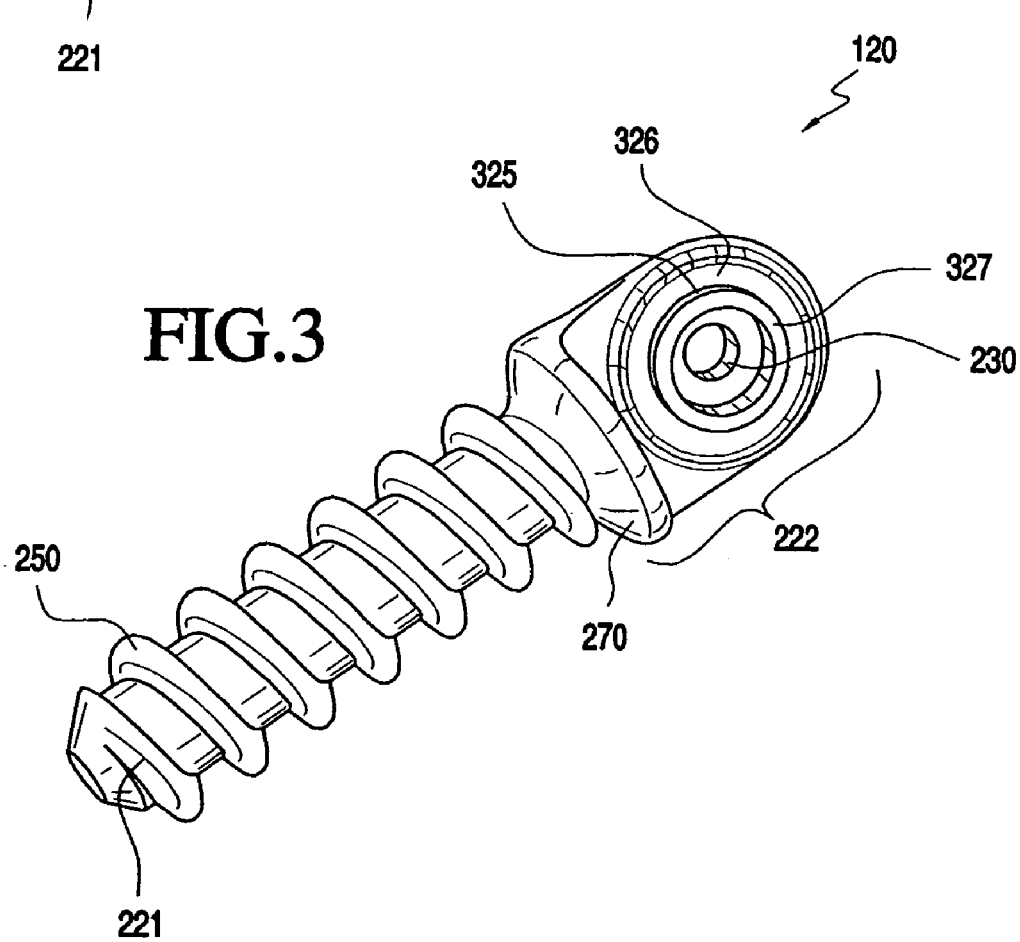
FIG. 3 is a perspective view of a second side of the portion of the apparatus of FIG. 1 according to an embodiment of the invention.

FIG. 2 is a perspective view of a first side of post 120 according to an embodiment of the invention. FIG. 3 is a perspective view of a second side of post 120 according to an embodiment of the invention. Referring to FIGS. 2 and 3, post 120 has an end 221 and an end 222 opposite end 221. End 222 has a face 225 and a face 325 opposite face 225. In the illustrated embodiment, face 225 is a grooved face comprising a plurality of grooves 226 alternating with a plurality of ridges 227. Face 325, in the illustrated embodiment, comprises a step 326 and a step 327. The functions of grooves 226, ridges 227, and steps 326 and 327 will be further explained below. Face 225 and face 325 define a hole 230 capable of receiving a bolt or the like for the purpose of coupling post 120 to support 110. As known in the art, a nut or the like may be used to secure the bolt in place.

Post 120 further comprises threads 250 and, in one embodiment, an indicator 260 for the purpose of indicating an unsafe or unstable insertion level of post 120 in base 130 (FIG. 1), as further explained below. As an example, indicator 260 can be a region or portion of post 120 that is colored, textured, or otherwise marked. Post 120 still further comprises a shelf 270 between end 221 and end 222.

Figure 4:
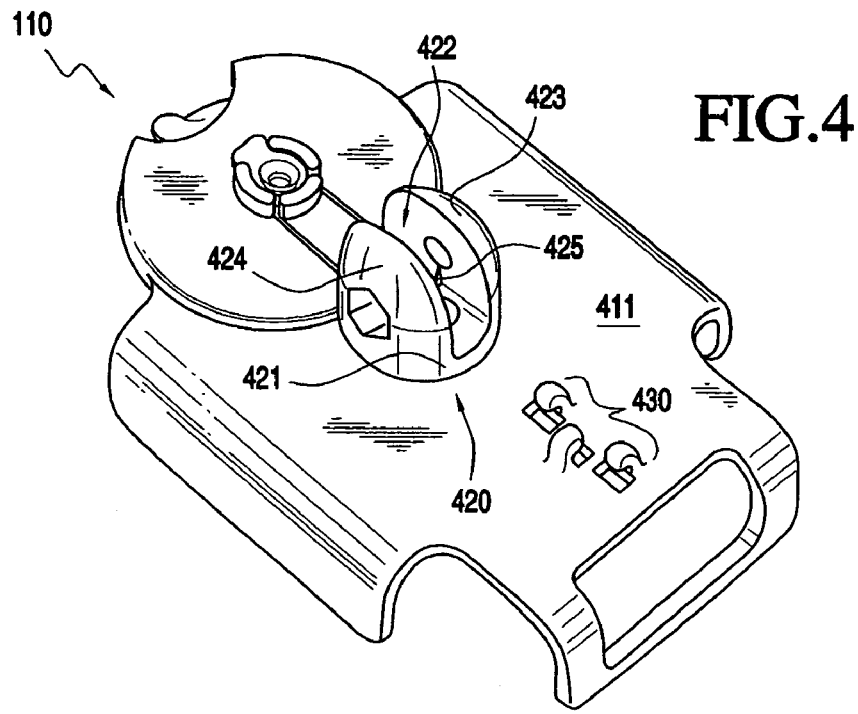
FIG. 4 is a perspective view of another portion of the apparatus of FIG. 1 according to an embodiment of the invention.

FIG. 4 is a perspective view of support 110 according to an embodiment of the invention. As illustrated in FIG. 4, support 110 further comprises a surface 411 opposite surface 111 (FIG. 1), a pivot mechanism 420 coupled to surface 411, and a clip 430 coupled to support 110 at surface 411. As an example, clip 430 can be used to contain and/or manage one or more cables, wires, or other electrical connectors used with the object being held by apparatus 100.

With reference now to FIGS. 1 and 4, a first vector (not explicitly illustrated) having its origin on surface 411 and passing through a point on surface 111 will be defined herein as having a first direction, and a second vector (not explicitly illustrated) having its origin on surface 111 and passing through a point on surface 411 will be defined herein as having a second direction. The first direction and the second direction may be, but are not necessarily, substantially perpendicular to each other. Lip 114 and sidewalls 112 and 113 of support 110 extend away from surface 111 in the first direction. Post 120 and pivot mechanism 420 extend away from surface 411 in the second direction.

Pivot mechanism 420 comprises a body 421 having a receiving slot 422 separating body 421 into an arm 423 and an arm 424, and a tooth 425 protruding from arm 423 such that tooth 425 protrudes into receiving slot 422. Pivot mechanism 420 is capable of receiving end 222 of post 120. As an example, tooth 425 rests in one of grooves 226 (FIG. 2) until a force or combination of forces is applied to apparatus 100 sufficient to urge tooth 425 out of the one of grooves 226, over one of ridges 227 adjacent to the one of grooves 226, and into a different one of grooves 226. This movement of tooth 425 from one to another of grooves 226 constitutes an adjustment in the angle between surface 111 (FIG. 1) and post 120 (FIG. 1).

Figure 5:
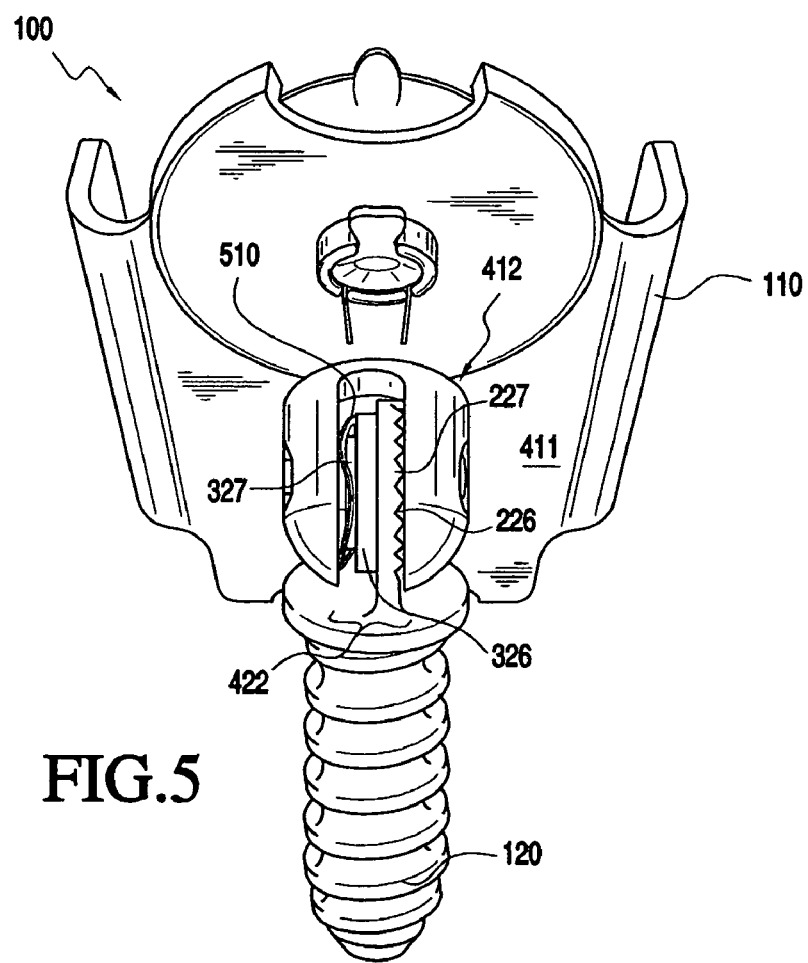
FIG. 5 is a perspective view of a portion of the apparatus of FIG. 1 in an assembled form according to an embodiment of the invention.

FIG. 5 is a perspective view of a portion of apparatus 100 in an assembled form according to an embodiment of the invention. As illustrated in FIG. 5, apparatus 100 further comprises a spring 510. As it is illustrated in FIG. 5, spring 510 comprises a wave spring. Wave springs, also known as wave washers or spring washers, are irregularly-shaped disks that deflect when loaded, thus maintaining appropriate tension between two surfaces. In the case of apparatus 100, spring 510 maintains an appropriate tension between post 120 and pivot mechanism 420 such that the force, first mentioned above in connection with FIG. 4, required to move tooth 425 (FIG. 4) between one of grooves 226 and another of grooves 226 is of sufficient magnitude that such movement is unlikely to occur in the absence of an intention to cause such movement on the part of a user of apparatus 100. As an example, and in an embodiment where spring 510 comprises a wave spring, a force of sufficient magnitude applied to spring 510 will cause a normally-curved portion of spring 510 to momentarily deflect or flatten out. This deflection of a portion of spring 510 creates a space sufficient to allow tooth 425 (FIG. 4) to slide past one or more of ridges 227 on its way from one of grooves 226 to another one of grooves 226.

When apparatus 100 is in assembled form, spring 510 is in pivot mechanism 420 and adjacent to end 222, and face 325, of post 120. As further illustrated in FIG. 5, spring 510 fits over and is supported by step 327 and rests against and/or is further supported by step 326. In other words, spring 510 is held in place in receiving slot 422 adjacent to end 222 (FIG. 2) of post 120. Spring 510 cooperates with pivot mechanism 420, tooth 425, and grooved face 225 of post 120 to allow an angle between support 110 and post 120 to be adjusted in discrete, predetermined increments. In one embodiment, the discrete, predetermined increments represent the incremental difference between the position of post 120 when tooth 425 (FIG. 4) is in a particular one of grooves 226 (FIG. 2) and the position of post 120 when tooth 425 is in an adjacent one of grooves 226.

Figure 6:
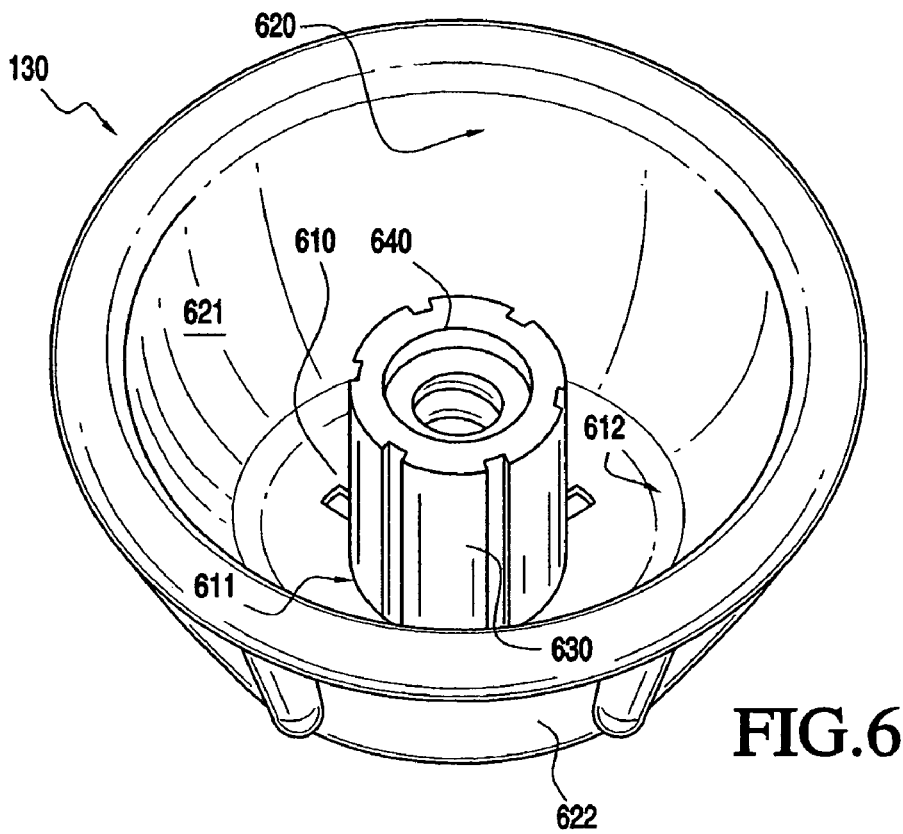
FIG. 6 is a perspective view of another portion of the apparatus of FIG. 1 according to an embodiment of the invention.

FIG. 6 is a perspective view of base 130 according to an embodiment of the invention. As illustrated in FIG. 6, base 130 comprises a floor 610 having a center 611 and a perimeter 612, a wall 620 coupled to floor 610 at perimeter 612 and extending away from floor 610 in a first direction, and a column 630 coupled to floor 610 at center 611 and extending away from floor 610 in the first direction. Column 630, which defines an opening 640, is capable of receiving end 221 (FIG. 2) of post 120 (FIG. 1). Wall 620 has an interior side 621 facing column 630, and an exterior side opposite interior side 621.

In the illustrated embodiment, column 630 is threaded in a manner complementary to, or so as to be compatible with, threads 250 (FIG. 2) of post 120 (FIG. 1). Referring again to FIG. 1, and still to FIG. 6, a distance between support 110 and base 130 may be decreased by rotating post 120 in a first manner with respect to column 630, and may be increased by rotating post 120 in a second manner with respect to column 630. As an example, the rotation in the first manner can be a clockwise rotation, tending to screw post 120 into base 130 and thus bring support 110 closer to base 130, and the rotation in the second manner can be a counterclockwise rotation, tending to unscrew post 120 from base 130 and thus move support 110 away from base 130.

In one embodiment, apparatus 100 includes features to indicate and/or prevent a condition in which post 120 has been rotated too far in either a clockwise or counterclockwise direction. Two examples of such features are indicator 260 and shelf 270, both of which were first discussed in connection with FIG. 2. As an example, the visibility of indicator 260 when post 120 is inserted in column 630 can indicate that too little of post 120 is threaded into column 630, thus warning of a potentially unstable or unsafe condition in which post 120 may become disengaged from or fall out of column 630. As another example, shelf 270 may have a circumference that is too large to fit within opening 640, such that only that portion of post 120 between shelf 270 and end 221 can be inserted into column 630.

Figure 7:
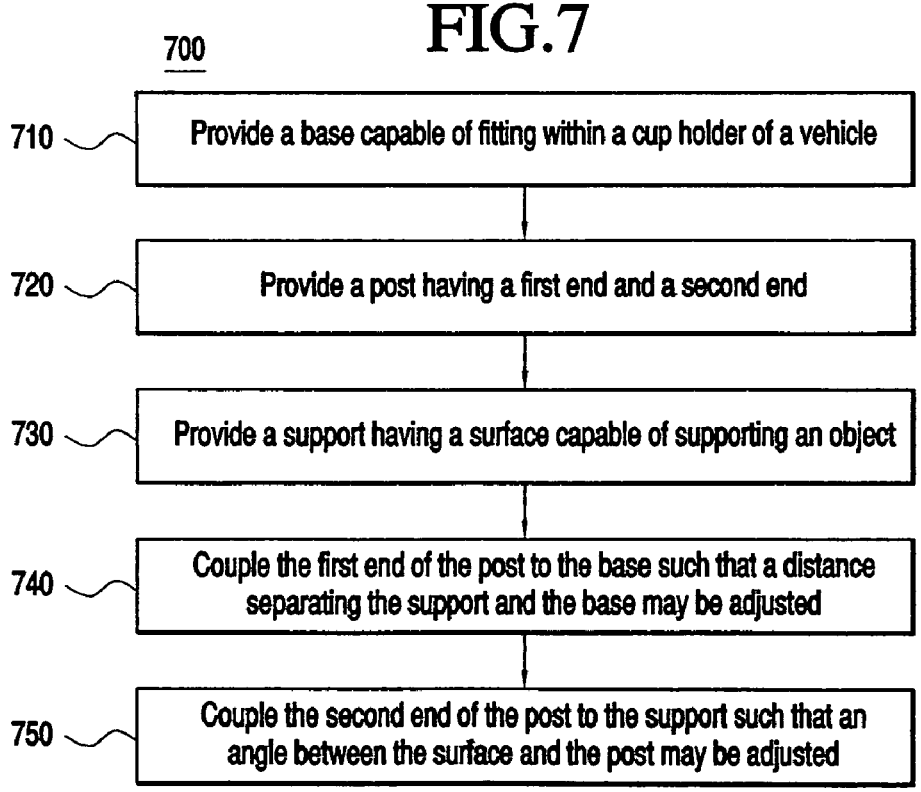
FIG. 7 is a flow chart illustrating a method of manufacturing an apparatus capable of holding an object in cooperation with a cup holder of a vehicle according to an embodiment of the invention.

FIG. 7 is a flow chart illustrating a method 700 of manufacturing an apparatus capable of holding an object in cooperation with a cup holder of a vehicle. A step 710 of method 700 is to provide a base capable of fitting within the cup holder of the vehicle. As an example, the base can be similar to base 130, first shown in FIG. 1.

A step 720 of method 700 is to provide a post having a first end and a second end. As an example, the post can be similar to post 120, first shown in FIG. 1, the first end can be similar to end 221, and the second end can be similar to end 222, both of which were first shown in FIG. 2.

A step 730 of method 700 is to provide a support having a surface capable of supporting the object. As an example, the support can be similar to support 110, and the surface can be similar to surface 111, both of which were first shown in FIG. 1.

A step 740 of method 700 is to couple the first end of the post to the base such that a distance separating the support and the base may be adjusted. As an example, the distance separating the post and the base may be adjusted by rotating the post with respect to the base in the manner discussed above.

A step 750 of method 700 is to couple the second end of the post to the support such that an angle between the surface and the post may be adjusted. As an example, the angle between the surface and the post may be adjusted by the application of a force or forces sufficient to urge the post from a first to a second position with respect to the surface, in the manner discussed above.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the apparatus discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of providing an apparatus capable of holding an object in cooperation with a cup holder of a vehicle, the method comprising:
   providing a base sized to fit within the cup holder of the vehicle;
   providing a post having a first threaded end and a second end and configured such that the first threaded end can be coupled to the base;
   providing a support to comprise:
      a surface configured to hold the object;
      a first sidewall coupled to the surface;
      a second sidewall coupled to the surface;
      a lip coupled to the surface, and separated from the first and second sidewalls; and
   coupling the second end of the post to the support; and
   providing an adapter cup sized to receive the base and sized to fit within the cup holder of the vehicle.

2. The method of claim 1, wherein:
   providing the base comprises:
      providing a first floor;

providing a first wall coupled to the first floor and extending away from the first floor in a first direction; and providing a threaded column coupled to the first floor and configured to be coupled to the first threaded end of the post.

3. The method of claim 2, further comprising:
providing the threaded column such that a distance between the support and the base can be decreased by rotating the post in a first manner with respect to the threaded column, and increased by rotating the post in a second manner with respect to the threaded column.

4. The method of claim 3, further comprising:
coupling the first threaded end of the post to the base; and
decreasing the distance between the support and the base by rotating the post in the first manner with respect to the threaded column.

5. The method of claim 3, further comprising:
coupling the first threaded end of the post to the base; and
increasing the distance between the support and the base by rotating the post in the second manner with respect to the threaded column.

6. A method of providing an apparatus capable of holding an object in cooperation with a cup holder of a vehicle, the method comprising:
providing a base sized to fit within the cup holder of the vehicle;
providing a post having a first threaded end and a second end and configured such that the first threaded end can be coupled to the base;
providing a support configured to hold the object, and to comprise:
a surface; and
a pivot mechanism coupled to and extending away from the surface;
providing the pivot mechanism to comprise:
a body having a receiving slot separating the body into a first arm and a second arm; and
a tooth protruding from the first arm such that the tooth protrudes into the receiving slot;
providing a wave spring in the receiving slot adjacent to the second end of the post;
providing the second end of the post to comprise a grooved face comprising a plurality of grooves; and
coupling the second end of the post to the support,
wherein:
the wave spring cooperates with the grooved face and the tooth to allow an angle between the surface and the post to be adjusted in discrete increments.

7. The method of claim 6, further comprising:
adjusting the angle between the surface and the post at least one discrete increment.

8. The method of claim 6, further comprising:
coupling a clip to the support at the surface.

9. The method of claim 6, further comprising:
coupling a suction cup to the surface.

10. The method of claim 1, further comprising:
placing at least a portion of the base in an adapter cup.

11. The method of claim 1, wherein:
providing an adapter cup comprises:
providing a second floor; and
providing a second wall coupled to the second floor and extending away from the second floor in a first direction.

12. A method of providing an apparatus capable of holding an object in cooperation with a cup holder of a vehicle, the method comprising:

providing a base;
providing a post having a first end and a second end;
providing a cradle having a surface and configured to cradle the object;
coupling the first end of the post to the base such that a distance separating the cradle and the base can be adjusted;
coupling the second end of the post to the cradle such that an angle between the surface and the post can be adjusted; and
providing an adapter cup sized to receive and configured to couple to the base.

13. The method of claim 12, further comprising:
adjusting the distance separating the cradle and the base.

14. The method of claim 12, further comprising:
adjusting the angle between the surface and the post.

15. The method of claim 12, wherein:
providing an adapter cup comprises:
providing a floor; and
providing a wall coupled to the floor and extending away from the floor in a first direction.

16. A method of providing an apparatus capable of holding an object in cooperation with a cup holder of a vehicle, the method comprising:
providing the apparatus to comprise:
a support;
a post coupled to the support, the post having a first threaded end; and
a base configured to receive the first threaded end of the post, the base comprising:
a threaded column configured to receive the first threaded end of the post;
attaching an object to the support; and
pivoting the support,
wherein:
the apparatus is configured such that at least a portion of the base can be placed in the cup holder of the vehicle.

17. The method of claim 16, further comprising:
decreasing a distance between the support and the base by rotating the post in a first manner with respect to the threaded column.

18. The method of claim 16, further comprising:
removing the base from the cup holder of the vehicle.

19. The method of claim 16, wherein:
attaching the object to the support comprises:
securing the object to the cradle using a suction cup coupled to the support.

20. The method of claim 16, wherein:
providing the apparatus to further comprise:
a floor configured to couple to the thread column; and
a wall coupled to the floor and extending away from the floor in a first direction,
wherein:
the base comprises the floor and the wall.

21. A method of providing an apparatus capable of holding an object in cooperation with a cup holder of a vehicle, the method comprising:
providing a base sized to fit within the cup holder of the vehicle;
providing a post having a first threaded end and a second end and configured such that the first threaded end can be coupled to the base;
providing a support to comprise:
a surface configured to hold the object;
a first sidewall coupled to the surface;
a second sidewall coupled to the surface;

a lip coupled to the surface and separated from the first and second sidewalls; and coupling the second end of the post to the support; and adjusting an angle between the surface and the post.

22. The method of claim 21, wherein:

adjusting the angle comprises:

adjusting the angle between the surface and the post in predefined, discrete increments.

23. A method of providing an apparatus capable of holding an object in cooperation with a cup holder of a vehicle, the method comprising:

providing a base sized to fit within the cup holder of the vehicle;

providing a post having a first threaded end and a second end and configured such that the first threaded end can be coupled to the base;

providing a support to comprise:

a surface configured to hold the object;

a first sidewall coupled to the surface;

a second sidewall coupled to the surface;

a lip coupled to the surface, and separated from the first and second sidewalls; and coupling the second end of the post to the support; and coupling a clip to the support at the surface.

24. A method of providing an apparatus capable of holding an object in cooperation with a cup holder of a vehicle, the method comprising:

providing a base sized to fit within the cup holder of the vehicle;

providing a post having a first threaded end and a second end and configured such that the first threaded end can be coupled to the base;

providing a support to comprise:

a surface configured to hold the object;

a first sidewall coupled to the surface;

a second sidewall coupled to the surface;

a lip coupled to the surface, and separated from the first and second sidewalls; and coupling the second end of the post to the support; and coupling a suction cup to the surface.

* * * * *